May 23, 1961 R. B. SQUIRES 2,985,765
LOAD CONTROL SYSTEM FOR PLURAL GENERATORS
Filed Nov. 18, 1958
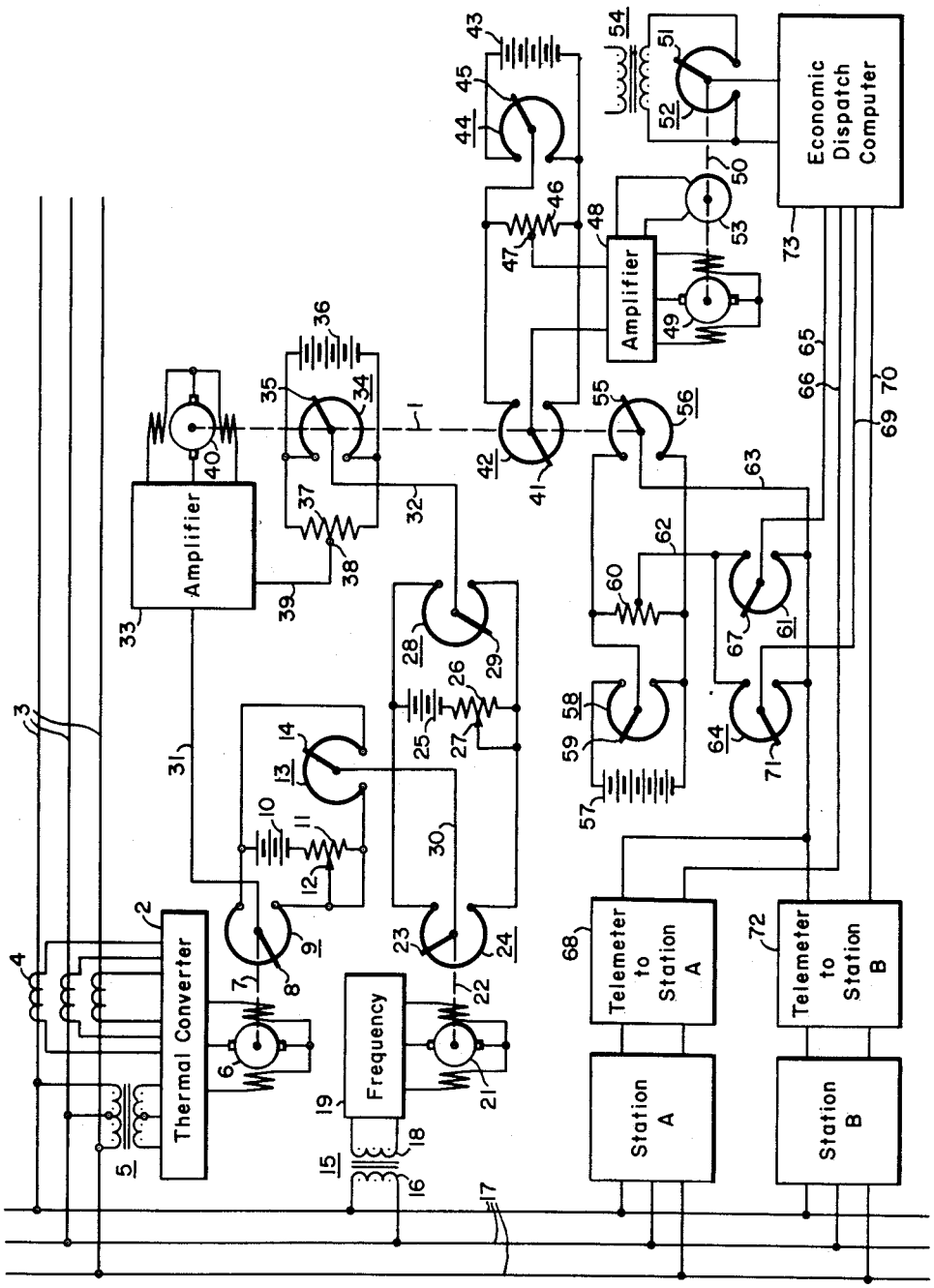
WITNESSES
Edwin E. Basler
James F. Young
INVENTOR
Rathbun B. Squires
BY
George C. Thompson
ATTORNEY United States Patent Office 2,985,765
Patented May 23, 1961

2,985,765
LOAD CONTROL SYSTEM FOR PLURAL GENERATORS

Rathbun B. Squires, Forest Hills, Pa., assignor to Westinghouse Electric Corporation, East Pittsburgh, Pa., a corporation of Pennsylvania Filed Nov. 18, 1958, Ser. No. 774,671

6 Claims. (Cl. 307—57)

This invention relates to a load control system for an electric generating station and more particularly to a load control system capable of sensing station load changes for the purpose of dictating generation changes to suit the station load changes.

In some previous automatic control systems, station load changes are sensed and used to establish the proper load setting of each station in the electric power distribution system. The system is, then, provided with an economic dispatch computer capable of determining approximate transmission losses. The output of the economic dispatch computer is, then, used to modify the total system load requirement control signal to provide a signal capable of dictating for most economic operation the bus bar output of each station in the system.

For some of the features of a previous automatic control system reference may be had to the copending patent application of Edwin L. Harder, Serial No. 556,149, entitled "Analogue Computer," filed December 29, 1955, and assigned to the common assignee.

The most economic operation is, of course, obtained when the fuel input to the whole generating system is a minimum, and it will be at a minimum if at every variable generating station the $$\left[\begin{array}{c}\text{Station incremental}\\\text{production cost}\end{array}\right]+\left[\text{lambda}\right]\left[\begin{array}{c}\text{Incremental transmission loss}\\\text{with that station}\end{array}\right]$$

=lambda. The term lambda in the art of electric power generation represents the incremental cost of delivered power.

It is an object of this invention to incorporate the economic dispatch computer into the system load control by having the computer modify the trend (slow) changes of the system load requirement before it is incorporated into the control for each individual station.

It is another object of this invention to provide system requirement control for the establishment of the input lambda for the economic dispatch computer.

It is another object of this invention to provide direct economic dispatch computer control of the output to each station in the system.

It is another object of this invention to provide economic dispatch computer modification of only the trend signal of the system maintaining the swing control as a separate signal unmodified by transmission losses.

Other objects, purposes and characteristic features will become obvious as the description of the invention progresses.

In practicing this invention, the power flow to or from each tie line and the power requirement of the system as a whole are sampled to provide a system area requirement signal represented by an area requirement shaft position. This shaft position is, then, used to provide fast and slow changes in system requirements by the introduction of signal inputs to a rapid response circuit as well as a slow integrating circuit. The output of the slow integrating circuit is, then, fed into an economic dispatch computer the output of which is combined with the output of the fast change circuit and used to control telemetering equipment capable of dictating the required load to be assumed by each station.

The figure of the drawing is a diagrammatic view of one embodiment of the load control system of this invention.

In the figure of the drawing similar parts bear like reference characters.

In order to provide economic loading of the station generators of a system, it is necessary to determine the load requirements of the system by sampling the transfer of energy through any tie lines as well as the system frequency (or system loading as indicated by frequency deviation) itself. These two factors are, then, combined to establish a system area requirement represented in this case by the position of the shaft 1. In order to establish the position of the shaft 1, a thermal converter 2 of any suitable well-known type, connected to the tie line conductors 3 through the current transformer 4 and the voltage transformer 5 is provided. The thermal converter 2 has its output connected to a reversible motor 6 connected through the mechanical link 7 to the sweep arm 8 of a suitable potentiometer 9. The potentiometer 9 has its end terminals connected across a suitable direct current source of power 10 through a series resistor 11 provided with a variable tap 12 capable of establishing the maximum voltage to be applied across the potentiometer 9. Connected in parallel with the direct current source 10 and series resistance 11 is the potentiometer 13 provided with a suitable manual set sweep arm 14 capable of being manually adjusted to a desired potential establishing the interchange set point for the tie line 3. The sweep arm 8 of the potentiometer 9, being positioned by the motor 6 controlled by the thermal converter 2, is, then, capable of being adjusted to a voltage level above or below the interchange set point established by the sweep arm 14 of the manual potentiometer 13. As will be made clear hereinafter, the output of the potentiometers 9 and 13 is used to provide one factor in the positioning of the area requirement shaft 1.

An additional factor needed to establish the area or system requirement is the sampling of the actual system loading as determined by a sampling of the frequency of the system provided through the transformer 15. The transformer 15 is provided with a primary 16 connected to the system conductors 17 and a secondary 18 connected to the frequency measuring device 19 (of any suitable well-known type). The system frequency measuring device produces a shaft rotation in a suitable reversible motor 21 which is proportional to the system frequency. The motor 21 is connected through suitable mechanical linkage 22 to a sweep arm 23 of a potentiometer 24. The potentiometer 24 is connected across a suitable direct current source 25 provided with a current limiting variable resistor 26 provided with a variable tap 27. Connected in parallel with the potentiometer 24 across the source 25 and the series resistor 26 is a potentiometer 28 provided with a movable sweep arm 29 capable of being manually positioned to establish a frequency set point for the system requirement. The potential difference between wire 30 and 32 is therefore proportional to the frequency error. In order to provide the system area requirement voltage, it is necessary to series connect the net interchange voltages with the error frequency of the system voltages. In order to accomplish this, the sweep arm 14 of the manual set potentiometer 13 is connected through the conductor 30 to the sweep arm 23 of the frequency error potentiometer 24. With this connection established an area requirement voltage is produced on the conductors 31 and 32 connected to the sweep arms 8 and 29, respectively, of the potentiometers 9 and 28, respectively. The area requirement voltage is, then, connected to the area requirement amplifier 33 through a feedback potentiometer 34 having a sweep arm 35 connected to the output area requirement shaft 1. The feedback potentiometer 34 is connected across a suitable direct current source 36 for energization. Also connected across the end terminals of the potentiometer 34 is an impedance member 37 which is center tapped as at 38 and connected through the conductor 39 to the input of the amplifier 33. The amplifier 33 amplifies the incoming signal to a usable level to control the area requirement motor 40. The area requirement motor 40 is reversible in response to the polarity of the input voltage supplied by the conductors 31 and 39. The shaft position of the area requirement shaft 1 now represents the total system requirement as established by the tie line loads and system frequency.

The shaft 1 is connected to a movable arm 41 of the potentiometer 42 connected across a suitable direct current source of power 43 through a potentiometer 44. The potentiometer 44 is connected across the direct current source 43 and is provided with a sweep arm 45 connected to one end terminal of the potentiometer 42. The remaining end terminal of the potentiometer 42 is connected to a common terminal with the source of power 43 and the potentiometer 44.

Since the trend signal is necessarily a signal in one direction or the other from a polarity standpoint a center tap resistor or impedance member 46 is provided, connected in parallel with the potentiometer 42 to provide a reference point established by its center tap 47. The center tap 47 is, then, connected to a suitable amplifier 48 along with the sweep arm 41 of the potentiometer 42 to provide an input to the amplifier 48. The output of the amplifier 48 represents the trend adjustment of the system and is, therefore, a slow adjustment representing a portion of the system requirement. This output is used to drive a suitable reversible motor 49 which in turn drives a shaft 50 connected to the sweep arm 51 of a suitable lambda potentiometer 52. In order to provide a stable lambda control voltage a feedback circuit representing the angular velocity of the shaft 50 is provided by a suitable device such as a tachometer 53, the output of which is fed into the amplifier 48 as a stabilizing feedback. In conjunction with potentiometer 44 it also sets the speed at which the motor runs for a given area requirement as represented by the departure of 41 from its mid position, i.e. 44 and 53 control the trend rate adjustment.

The lambda potentiometer 52 is provided with energy from a suitable alternating current source 54 connected thereacross. One terminal of the potentiometer 52 and the sweep arm 51 of the potentiometer 52 is, then, used as an input to a suitable economic dispatch computer 73 similar to the type shown and described in the hereinabove mentioned copending patent application of Edwin L. Harder. The economic dispatch computer, then, provides an output voltage for each station proportional to the power that station should carry in response to the system trend requirements modified by the transmission losses of the system. This output is, then, combined with the swing changes to be described hereinafter to provide station control.

The area requirement shaft 1 for the system is additionally connected to a potentiometer sweep arm 55 of a suitable potentiometer 56. The potentiometer 56 is connected across a suitable direct current source of power 57 through a voltage setting potentiometer 58. The potentiometer 58 is provided with a sweep arm 59 connected to one terminal of the potentiometer 56, with the remaining terminal of the potentiometer 56 connected to the direct current source terminal common to one terminal of the potentiometer 58. Connected in parallel with the potentiometer 56 is a center tap resistor impedance member 60 capable of providing a reference point above and below which the potentiometer 56 can provide potentials. The potentiometer 56, then, establishes the system swing participation required, proportional to the area requirement. The potentiometer 58 adjusts this proportionality and hence controls the amount of swing participation of all stations compared to their trend participation.

In order to provide the individual participation of each individual station in the system, a potentiometer for each station is connected between the center tap of the impedance member 60 and swing arm 55 of the swing potentiometer 56. In the system shown, there are only two stations in the system and, therefore, a potentiometer 61, capable of representing the swing participation of station A, is connected across the conductors 62 and 63 connected to the center tap of the resistor 60 and to the swing arm 55, respectively. Connected in parallel with the potentiometer 61 is the potentiometer 64 for establishing the participation of station B in the total system swing requirement.

The output of the economic dispatch computer 73 representing the trend participation of station A is series connected through the conductors 65 and 66 and the switch potentiometer having its sweep arm 67 adjusted to the swing participation of station A to telemetering equipment 68 capable of transmitting a signal to station A for adjustment of the output of station A into the system. Likewise, the output of the economic dispatch computer 73 for station B found on the conductors 69 and 70 is series connected with the swing participation established by the movable arm 71 of the swing potentiometer 64 to the telemetering equipment 72 capable of providing a signal to station B for establishing its load share output into the system.

A brief description of the operation of the circuit of this invention will now be presented. The thermal converter 2 samples the net interchange of the tie line 3 and results in the positioning of the sweep arm 8 of the potentiometer 9 to a position showing either a delivery of power or a reception of power over the conductors 3, whichever the case may be. Whether the power being delivered or received over the conductors 3 is greater or less than the desired interchange power established by the potential level of the sweep arm 8 with respect to the potential level of the sweep arm 14 of the manually adjusted interchange set point. The position of the sweep arm 29 of the potentiometer 28 is adjusted to the potential representing the desired frequency level and is compared with the actual system frequency indicated by the adjustment of the potentiometer 24. This frequency error voltage is, then, algebraically added to the net interchange voltage to provide an area requirement voltage capable of controlling the amplifier 33 for positioning the area requirement shaft 1. The position of the area shaft 1 is also used to control the potentiometer 34 for matching the area requirement voltage supplied to the amplifier 33 so that the position of shaft 1 is always proportioned to area requirement.

The position of the area requirement shaft 1 establishes the position of the sweep arm 41 of the potentiometer 42 used to control a lambda control amplifier 48. The lambda control amplifier 48 in turn changes the position of the sweep arm 51 of a lambda potentiometer as long as there is an area requirement and at a speed proportional to the area requirement. The economic dispatch computer responds to the control of the lambda potentiometer and changes the power on each variable station an amount which takes into account both the bus bar incremental cost at that station and the incremental cost of transmission losses that are chargeable to that station. The computer then controls each station to these amounts until the area requirement is satisfied. At that time the area requirement shaft 1 is in the mid position, no voltage is applied to the lambda control amplifier 48 and the position of the lambda potentiometer shaft 50 no longer changes. In addition to the trend adjustment, the area requirement shaft also adjusts the potentiometer 56 to establish the swing participation needed for the system as a whole. The swing participation is, then, applied to parallel connected potentiometers for establishing the swing participation of each station in the system. The trend output of the economic dispatch computer 73 for each station is, then, series connected with the swing participation for each station to establish a telemetering composite signal to the associated station to control the bus bar supply of power to the system.

Since numerous changes may be made in the above-described construction, and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. A load control system for a plurality of electric power generating stations comprising, in combination, a sensing means for determining total generation requirement for said stations, a first means for separating said total generation requirement into a slow change integrated requirement and a rapid change swing requirement, a modified lambda voltage generating means, said first means being connected to said lambda voltage generating means to control said lambda voltage generation to be proportional to said integrated requirement, an economic dispatch computer connected to said lambda voltage generation means for producing a composite integrated requirement, means for producing a transmission loss voltage output for each station, a swing control means connected to said last named means and controlled to produce a total swing participation voltage, second means for producing a generation station swing participation voltage for each station, said swing participation voltage for each station and composite voltage output for each station being combined to control each station to the proper generation level.

2. A load control system for a plurality of electric power generating stations comprising, in combination, a sensing means for determining total generation requirement for said stations, a first means for separating said total generation requirement into a slow change integrated requirement and a rapid change swing requirement, a modified lambda voltage generating means, said first means being connected to said lambda voltage generating means to control said lambda voltage generation to be proportional to said integrated requirement, an economic dispatch computer connected to said lambda voltage generation means for producing a composite integrated requirement, transmission loss voltage output means for each station, a swing control means connected to said transmission loss voltage output means and controlled to produce a total swing participation voltage, second means for producing a generation station swing participation voltage for each station, said swing participation voltage for each station and composite voltage output for each station being combined to control each station to the proper generation level, said lambda voltage generation means comprising a potentiometer having a variable arm connected to said first means to be positioned by said first means in proportion to said slow change integrated requirement.

3. A load control system for a plurality of electric power generating stations comprising, in combination, a sensing means for determining total generation requirement for said stations, a first means for separating said total generation requirement into a slow change integrated requirement and a rapid change swing requirement, a modified lambda voltage generating means, said first means being connected to said lambda voltage generating means to control said lambda voltage generation to be proportional to said integrated requirement, as economic dispatch computer connected to said lambda voltage generation means for producing a composite integrated requirement, transmission loss voltage output producing means for each station, a swing control means connected to said transmission loss voltage output means and controlled to produce a total swing participation voltage, second means for producing a generation station swing participation voltage for each station, said swing participation voltage for each station and composite voltage output for each station being combined to control each station to the proper generation level, said lambda voltage generation means comprising a potentiometer having a variable arm connected to said first means to be positioned by said first means in proportion to said slow change integrated requirement, said first means comprising first and second potentiometers having variable position arms positioned in response to said total generation requirement sensing means.

4. A load control system for a plurality of electric power generating stations comprising, in combination, a sensing means for determining total generation requirement for said stations, a first means for separating said total generation requirement into a slow change integrated requirement and a rapid change swing requirement, a modified lambda voltage generating means, said first means being connected to said lambda voltage generating means to control said lambda voltage generation to be proportional to said integrated requirement, an economic dispatch computer connected to said lambda voltage generation means for producing a composite integrated requirement, transmission loss voltage output producing means for each station, a swing control means connected to said transmission loss voltage output producing means and controlled to produce a total swing participation voltage, second means for producing a generation station swing participation voltage for each station, said swing participation voltage for each station and composite voltage output for each station being combined to control each station to the proper generation level, said lambda voltage generation means comprising a potentiometer having a variable arm connected to said first means to be positioned by said first means in proportion to said slow change integrated requirement, said first means comprising first and second potentiometers having variable position arms positioned in response to said total generation requirement sensing means, motive means connected to said first potentiometer for position control in response to the position of the variable arm of said first potentiometer, said motive means being connected to said lambda voltage generating means potentiometer for adjusting the lambda voltage output to be proportional to said slow change integrated requirement.

5. A load control system for a plurality of electric power generating stations comprising, in combination, a sensing means for determining total generation requirement for said stations, a first means for separating said total generation requirement into a slow change integrated requirement and a rapid change swing requirement, a modified lambda voltage generating means, said first means being connected to said lambda voltage generating means to control said lambda voltage generation to be proportional to said integrated requirement, an economic dispatch computer connected to said lambda voltage generation means for producing a composite integrated requirement, transmission loss voltage output producing means for each station, a swing control means connected to said transmission loss voltage output producing means and controlled to produce a total swing participation voltage, second means for producing a generation station swing participation voltage for each station, said swing participation voltage for each station and composite voltage output for each station being combined to control each station to the proper generation level, said second means comprising a plurality of parallel connected potentiometers providing one potentiometer for each station, each of said parallel connected potentiometers being adjusted to the desired swing participation level for the associated station.

6. A load control system for a plurality of electric power generating stations comprising, in combination, a sensing means for determining total generation requirement for said stations, a first means for separating said total generation requirement into a slow change integrated requirement and a rapid change swing requirement, a modified lambda voltage generating means, said first means being connected to said lambda voltage generating means to control said lambda voltage generation to be proportional to said integrated requirement, an economic dispatch computer connected to said lambda voltage generation means for producing a composite integrated requirement, transmission loss voltage output producing means for each station, a swing control means connected to said transmission loss voltage output producing means and controlled to produce a total swing participation voltage, second means for producing a generation station swing participation voltage for each station, said swing participation voltage for each station and composite voltage output for each station being combined to control each station to the proper generation level, said lambda voltage generation means comprising a potentiometer having a variable arm connected to said first means to be positioned by said first means in proportion to said slow change integrated requirement, said first means comprising first and second potentiometers having variable position arms positioned in response to said total generation requirement sensing means, motive means connected to said first potentiometer for position control in response to the position of the variable arm of said first potentiometer, said motive means being connected to said lambda voltage generating means potentiometer for adjusting the lambda voltage output to be proportional to said slow change integrated requirement, and stabilizing feedback means connected to respond to the position of said motive means to provide a feedback voltage opposing said first potentiometer position control of said motive means.

No references cited.